(12) United States Patent
Lee et al.

(10) Patent No.: US 7,895,188 B2
(45) Date of Patent: Feb. 22, 2011

(54) PROCESSING METHOD OF DATA STREAM USING BORDER MONITORING QUERY

(75) Inventors: Jin Won Lee, Daejeon (KR); Young Ki Lee, Daejeon (KR); Seung Woo Kang, Daejeon (KR); Sang Jeong Lee, Daejeon (KR); Hyun Ju Jin, Daejeon (KR); Byung Jip Kim, Daejeon (KR); June Hwa Song, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 957 days.

(21) Appl. No.: 11/741,923

(22) Filed: Apr. 30, 2007

(65) Prior Publication Data

US 2008/0288441 A1    Nov. 20, 2008

(30) Foreign Application Priority Data

May 8, 2006    (KR) .................... 10-2006-0040879

(51) Int. Cl.
*G06F 7/00*       (2006.01)
*G06F 17/30*      (2006.01)
(52) U.S. Cl. ...................................... 707/713; 707/715
(58) Field of Classification Search .............. 707/802, 707/803, 804, 711, 713, 715, 999, 705, 736, 707/741
See application file for complete search history.

(56) References Cited

U.S. PATENT DOCUMENTS

2006/0287984 A1\* 12/2006 Chen et al. .................... 707/3

\* cited by examiner

*Primary Examiner*—Angela M Lie
(74) *Attorney, Agent, or Firm*—Greenblum & Bernstein, PLC

(57) ABSTRACT

The present invention relates to a processing method of data stream using Border Monitoring Query, and more particularly a monitoring method and a system for data streams which are a large volume of data and continuously generated such as financial ticker, GPS data or a ubiquitous sensor network (USN).

The objectives of the present invention are to process a large number of BMQs over data streams in high-performance and scalable manner. For this purpose, the invention presents BMQ-Index, a scalable and high performance data stream monitoring framework. The main idea of BMQ-Index is shared and incremental processing. For shared processing, BMQ-Index adopts a query indexing approach, thereby achieving a high level of scalability. Once BMQ-Index is built on registered queries, only relevant queries are quickly searched for upon an incoming data. For incremental processing, BMQ-Index employs an incremental access method, i.e., an index structure to store delta query information and an incremental search algorithm. Thus, successive BMQ evaluations are greatly accelerated.

27 Claims, 6 Drawing Sheets

$$\text{If } j < h, \quad QSet^+ = [U^k_{i,j+1} +DQSet_i] - [U^k_{i,j+1} -DQSet_i]$$
$$QSet^- = [U^k_{i,j+1} -DQSet_i] - [U^k_{i,j+1} +DQSet_i]$$
$$\text{If } j > h, \quad QSet^+ = [U^{h+1}_{i,j} -DQSet_i] - [U^{h+1}_{i,j} +DQSet_i]$$
$$QSet^- = [U^{h+1}_{i,j} +DQSet_i] - [U^{h+1}_{i,j} -DQSet_i]$$
$$\text{If } j = h, \quad QSet^+ = QSet^- = \emptyset$$

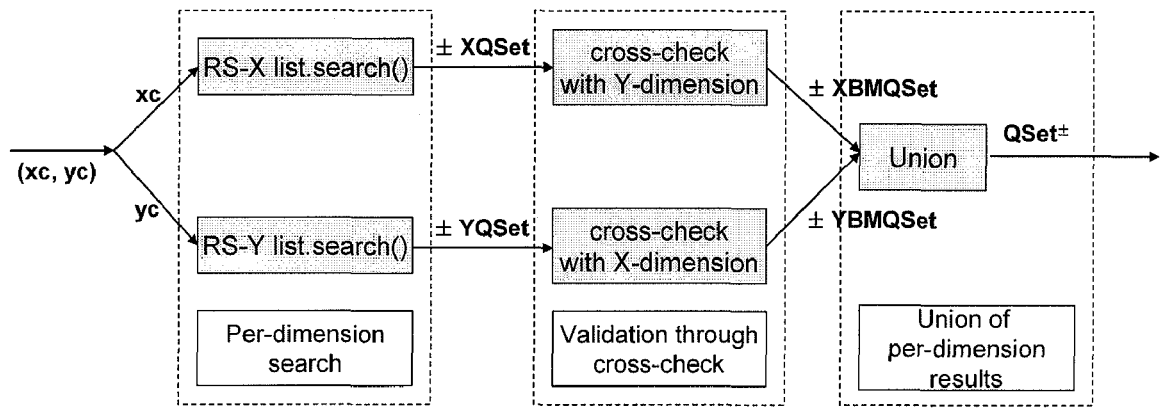

FIG. 5

```
/* Cross-check algorithm to validate queries in ±XQSet and ±YQSet */
/* Input : stream s_i's data tuple with value of (v_Xc, v_Yc)          */

/* Initialize the result sets */
±XBMQSet= {} and ±YBMQSet = {};

/* Validate ±XQSet through cross-check with Y-dimension */
For each element Q_i of +XQSet
    Get Q_i's Y-dimension predicate, (Q_{i_yl}, Q_{i_yh}), from the query table
    If(Q_{i_yl} <v_Yc< Q_{i_yh})   +XBMQSet ← Q_i Obtain s_i's previous data value, (v_Xp, v_Yp), using the stream table
For each element Q_i of −XQSet
    Get Q_i's Y-dimension predicate, (Q_{i_yl}, Q_{i_yh}), from the query table
    If(Q_{i_yl} <v_Yp< Q_{i_yh})   −XBMQSet ← Q_i /* Validate ±YQSet through cross-check with X-dimension */
Cross-check queries in ±YQSet with X-dimension using above method;

/* Output : ±XBMQSet and ±YBMQSet */
```

FIG. 6

PROCESSING METHOD OF DATA STREAM USING BORDER MONITORING QUERY

TECHNICAL FIELD

The present invention relates to a processing method of data stream using Border Monitoring Query, and more particularly a monitoring method and a system for data streams which are a large volume of data and continuously generated such as financial ticker, GPS data or a ubiquitous sensor network (USN).

BACKGROUND ART

Advances in mobile computing and embedded device technologies open up new computing environments. The environments contain numerous data generators such as sensors, probes and agents, which generate data in the form of continuous data stream. In order to monitor such data streams and take proper actions promptly, if needed, users register a large number of range queries or filters which are evaluated continuously. We call them continuous range queries. There have been extensive inventions on evaluating a large number of continuous range queries. However, they concentrate on processing Region Monitoring Queries (RMQs) rather than Border Monitoring Queries (BMQs). RMQ reports all matching data streams in a query range. However, BMQ only reports data streams coming into or going out from a query range.

Query indices have widely been used for shared evaluation of RMQs. We call such a query index a RMQ-Index. Upon each data arrival, matching queries are quickly determined by searching the query index. RMQ-Indices have been invented for one-dimensional and two-dimensional range queries. The indices proposed for 1-D range queries can again be categorized to a tree-based query index or a grid-based query index. The tree-based indices such as Interval Skip List (IS-list) have O(log N) search cost and O(N log N) storage cost, where N is the number of registered queries. Compared to the tree-based indices, the grid-based query index such as Containment Encoded Interval (CEI) has better search performance. There are also tree-based query indices as well as grid-based ones for 2-dimensional range queries. For 2-dimensional queries as well, the grid-based indices show much better search performance than the tree-based ones. However, the grid-based indices require much larger storage space since queries are redundantly inserted into multiple grids depending on query ranges. Generally, the grid-based indices for 2-dimensional consume larger storage space than those for 1-dimensional due to the increase in the number of grids.

Due to the semantic difference between RMQ and BMQ, the existing RMQ-Indices are generally not suitable for BMQs. If a RMQ-Index is used for BMQ evaluation, costly post-processing is required to sort out only the border-crossing data streams. Thus, the performance becomes considerably low compared to that of our invention, which is specifically designed for efficient BMQ evaluation.

DISCLOSURE

Technical Problem

Accordingly, the present invention is provided to substantially obviate one or more problems due to limitations and disadvantages of the related art. Some embodiments of the present invention provide a method and a system of processing data streams to solve problems related with existing technology, and to efficiently process a large number of BMQs over data streams.

The BMQ processing is motivated by two observations. First, for many monitoring applications, it is sufficient for users to report the triggering and stopping events of user-specified condition, rather than to report all matching data. For example, if one is monitoring stock prices, then one wants an alert event as soon as prices get higher than a user-specified price. All subsequently matching data are only needed for detailed investigation, as long as the prices do not get lower than the specified price again. Second, triggering and stopping events are frequently coupled to necessary actions beyond monitoring itself. The events are compelling to users who want proper actions to be automatically triggered or stopped. For example, buying or selling stock could be automatically done by alert events generated right after prices get higher or lower than user-specified price. Such an approach is essential for emerging action-oriented actuator networks to operate them automatically by coupling to sensor networks.

BMQ processing system handles a large volume of data streams and report detected events in real-time. Users issue a large number of requests, personalized to their own needs, and expect real-time responses without tolerating stale data and response. Therefore, BMQ processing must be high performance and scalable. Also, since only in-memory algorithm is practical for data stream processing, low storage cost is essential for BMQ processing.

Technical Solution

The present invention is proposed for resolving the problems of the above prior arts, and the objectives of the present invention are to process a large number of BMQs over data streams in high-performance and scalable manner.

In order to achieve the above objectives, theoretical approaches are explained as follows. There are three theoretical approaches of the present invention. First, the semantic definition of Border Monitoring Query (BMQ) and its extension are provided. Second, BMQ-Index, an efficient query index specialized for evaluating a large number of BMQ evaluation, is provided. The main idea of BMQ-Index is shared and incremental processing. For shared processing, BMQ-Index adopts a query indexing approach, thereby achieving a high level of scalability. Once BMQ-Index is built on registered queries, only relevant queries are quickly searched for upon an incoming data. For incremental processing, BMQ-Index employs an incremental access method, i.e., an index structure to store delta query information and an incremental search algorithm. Thus, successive BMQ evaluations are greatly accelerated. Based on main ideas, a one-dimensional BMQ-Index structure and a search algorithm are provided. The one-dimensional index divides the range of possible data values into Region Segments by the borders of queries. It stores a query into only two segments where the query range starts and ends. Upon an incoming data, border-crossed queries are incrementally derived during linear traversals from a previous matching segment to a current matching segment. Third, a multi-dimensional BMQ-Index is provided by directly extending one-dimensional BMQ-Index. For multi-dimensional search operation, we additionally invent a cross-check algorithm.

Based on theoretical approaches described above, some embodiments of the present invention provide a system including the central processing unit, the database storing the BMQ-Index, the data stream sensor, a method which processes data streams using Border Monitoring Query, comprising;

The step for identifying a data stream in the sensor;

The step for checking an ID of the data stream in the central processing unit, testing whether the data stream is registered in the BMQ-Index or not;

The step for assigning a new node pointer based on the new data value for the data stream in the central processing unit;

The step for processing the new information for the data stream using the BMQ-Index in the central processing unit, and;

The step for updating the previous BMQ-Index for the data stream with the new node pointer and new data value in the central processing unit.

ADVANTAGEOUS EFFECTS

BMQ-Index has two advantageous effects: excellent search performance and low storage cost. As mentioned before, the shared and incremental processing enables BMQ-Index to achieve remarkable search performance. Also, BMQ-Index only needs to maintain delta query information, which consumes a small size of memory space. Compared to the straightforward approach based on state-of-the-art RMQ evaluation mechanism, BMQ-Index achieves much better search performance and storage cost.

DESCRIPTION OF DRAWINGS

FIG. 5 is a flow of search algorithm for two-dimensional BMQ-Index.

FIG. 6 is a cross-check algorithm.

DESCRIPTION OF THE NUMERALS ON THE MAIN PARTS OF THE DRAWINGS

| | |
|---|---|
| 100: One-dimensional BMQ-Index | 101: Stream Table |
| 102: RS(Region Segment) list | 103: Registered BMQs |
| 200: Two-dimensional BMQ-Index | 201: Stream Table |
| 202: RS(Region Segment) X-list | 203: RS(Region Segment) Y-list |
| 204: Query Table | 701: Central Processing Unit |
| 702: Database | 703: Data Stream Sensors |
| 704: Input Unit | 705: Output Unit |

MODE FOR INVENTION

Hereinafter, referring to appended drawings, the structures and operation principles for the embodiments of present invention are described in detail.

Before describing the embodiment of present invention in detail, theoretical backgrounds are described.

As the first theoretical background, the semantic definition of Border Monitoring Query (BMQ) and its extension are described.

Many stream-based applications continuously monitor a large number of data streams with range queries. In this situation, it is quite important to know which data streams begin or end to satisfy range conditions of queries. It is mainly because users are usually interested in whether the continuous data streams satisfy range conditions or not. Thus, it is sufficient for people to know only the beginnings and ends of satisfying range conditions rather than all satisfying events. (see scenario 2) Also, the beginnings and ends of satisfying range conditions are useful to automatically trigger or stop necessary actions. (see scenario 1 and 2) Furthermore, it is possible to know the satisfaction interval of data streams (see scenario 3) In processing standpoint, notifying only the beginnings and ends rather than all satisfying events saves network bandwidth.

<Scenario 1: Financial Trading>

Consider the case of NASDAQ. Thousand of companies generate the streams of updates such as stock prices every 30 seconds. In addition, millions of stock investors monitor them by registering their own queries. Assume that a stock investor wants to automatically buy IBM stock right after the price of stock falls below $40 and sell his stock when the price rises above $50. In this situation, it is very useful for the investor to be notified whenever price goes above or below a user-specified border.

<Scenario 2: Location-Based Advertisement>

Figure 1:
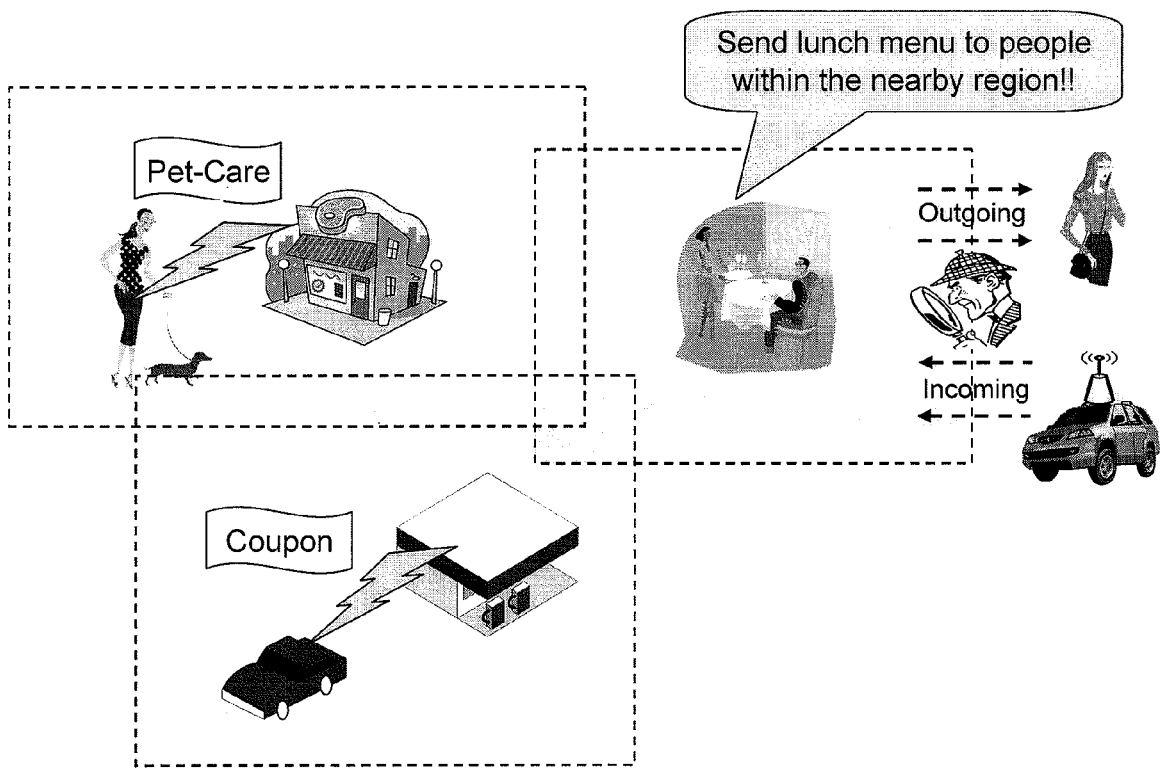
FIG. 1 is a view illustrating a location-based advertisement.

As shown in FIG. 1, many restaurants, cafes, and gas stations are willing to advertise lunch menu or send a discount coupon to people within nearby rectangle regions for two hours. For this service, it is required to quickly locate the people who are coming into or going out from the specified region by monitoring the streams of people's locations. People do not like to receive the same advertisement more than once. Thus, it is not necessary to locate the people which are already in the region.

<Scenario 3: Parking Zone Management>

In a city, there are a lot of parking garages and illegal parking zones in roads and buildings. The regional government charges fees or identifies illegal parking automatically by monitoring the locations of vehicles. Such a parking zone management system has to identify when vehicles come into and go out from the parking zones by border monitoring. In this way, the system can determine the illegal parking or charge fee based on parking duration.

The semantic of BMQ is defined as follows. The semantic of range queries in the above border monitoring scenarios are different from well-known range queries in data stream processing. To distinguish such queries, we classify continuous range queries into two types, i.e., Border Monitoring Queries (BMQ) and Region Monitoring Queries (RMQ). Continuous range queries in existing data stream processing fall into the category of RMQ, i.e., the query that reports all data within a query range. BMQ is a type of query which reports only data crossing the border of a query range.

The formal definition of BMQ on the set of data is as follows. Suppose that two consecutive sets of data and a BMQ are given. Let RSet(t−1) represent the data contained in the query range at previous update time t−1 and RSet(t) represent the ones at current update time t. Then, two sets of data are defined as the result of the BMQ.

<Definition 1. Border Monitoring Query (BMQ)>

$RSetBMQ^+(t) = RSet(t) - RSet(t-1)$ $RSetBMQ^-(t) = RSet(t-1) - RSet(t)$

The extension of BMQs is described. Basically, the extension of BMQ is an aggregation on BMQ results. We assume that the size of BMQ result is limited by window. E.g., BMQ result for 24 hours, last 100 tuples of BMQ result. Since a BMQ result is generated continuously, we need a window which limits the size of BMQ result.

Aggregation on BMQ results is classified into two methods. The first one is COUNT. It is to count the number of tuples in BMQ results. There are four type of COUNT and their unique semantics are follows.

| COUNT type | Unique semantic |
| --- | --- |
| COUNT(RSetBMQ$^+$(t)) | The number of streams coming into a region (inflow) |
| COUNT(RSetBMQ$^-$(t)) | The number of streams going out from a region (outflow) |
| COUNT(RSetBMQ$^+$(t)) − COUNT(RSetBMQ$^-$(t)) | The number of streams purely coming into a region (neflow) |
| COUNT(RSetBMQ$^+$(t)) + COUNT(RSetBMQ$^-$(t)) | The number of streams coming into and going out from a region (totalflow) |

Above COUNT methods are useful to monitor the change of data streams. Assume that incoming and outgoing cars are monitored in KAIST campus region. The cars periodically report their location to the system. (1) Through COUNT (RSetBMQ$^+$(t)), we can know how many cars come into the KAIST campus region. (2) Through COUNT(RSetBMQ$^-$(t)), we can know how many cars go out from the KAIST campus region. (3) Through COUNT(RSetBMQ$^+$(t))−COUNT(RSetBMQ$^-$(t)), we can know whether the number of cars in KAIST campus region increase or not. If this value is positive, it means that number of cars increases. It the value is negative, it means that number of cars decrease. (4) Through COUNT(RSetBMQ$^+$(t))+COUNT(RSetBMQ$^-$(t)), we can know the total number of flowing cars in KAIST campus region. Larger value means that more cars comes into and go out from KAIST campus region.

The second aggregation method on BMQ result is temporal aggregation. BMQ results contain three time information. That is, begin time, end time, and time interval of satisfying range condition. By aggregating this time information, useful information can be derived. In particular, five temporal aggregation such as MIN (minimum), MAX (maximum), AVG (average), Bottom-k, Top-k are possible. The below table summarize the unique semantic of temporal aggregations.

Assume that incoming and outgoing the employees of KAIST are monitored in KAIST campus region. The employees periodically report their location to the system. (1) Through begin time, the earliest attendance time (MIN), the latest attendance time (MAX), average attendance time (AVG), k employees who attend the office earliest (Bottom-k), k employees who attend the office latest (Top-k). (2) Through end time, the earliest leaving time (MIN), the latest leaving time (MAX), average leaving time (AVG), k employees who leave his office earliest (Bottom-k), k employees who leave his office latest (Top-k). (3) Through time interval, the shortest working time interval (MIN), the longest working time interval (MAX), average working time interval (AVG), k employees whose working time interval are shortest (Bottom-k), k employees whose working time interval are longest (Top-k).

As a second theoretical background, a structure and a processing algorithm for one-dimensional BMQ-Index are described.

<Index Structure>

One-dimensional BMQ-Index(100) consists of two data structures: a stream table(101) and an RS(Region Segment: 102) list. The stream table maintains a node pointer to the last located RS node for each data stream. A data stream is distinguished by Stream_ID although data streams simultaneously flow into BMQ-Index from multiple sources. Such identification is quickly done in O(1) because the stream table entries are hashed by Stream_ID.

RS list is defined as follows. Let $Q=\{Q_i\}$ be a set of continuous range queries where a query $Q_i$ has the range $(l_i, u_i)$ and let B denote the set of lower and upper bounds of the range of each $Q_i$ in Q, i.e., $B=\{b|b$ is either $l_i$ or $u_i$ of a $Q_i \in Q\} \cup \{\infty\}$. We denote the elements of the set B with a subscript in increasing order of their values. That is, $b_0 < b_1 < \ldots < b_m < b_{m+1}$.

An RS list is a list of RS nodes, $<N_1, N_2, \ldots, N_m, N_{m+1}>$. Each RS node $N_i$ is a tuple $(R_i, +DQSet_i, -DQSet_i)$, where $R_i$ is the range of region segment $(b_{i-1}, b_i)$, $b_i \in B$ $+DQSet_i$ is the set of queries $Q_k$ such that $l_k = b_{i-1}$ for the range $(l_k, u_k)$ of $Q_k$ $-DQSet_i$ is the set of queries $Q_k$ such that $u_k = b_{i-1}$ for the range $(l_k, u_k)$ of $Q_k$ An RS node holds two delta query sets, $+DQSet_i$ and $-DQSet_i$. $+DQSet_i$ is the set of queries $Q_k$ that share the lower bound of their range with that of $R_i$, i.e., $Q_k \in +DQSet_i$ if

| Time Information | Temporal Aggregation | Unique semantic |
| --- | --- | --- |
| begin time | MIN | The time when the first stream comes into a region |
| | MAX | The time when the last stream comes into a region |
| | AVG | The average incoming time of streams into a region |
| | Bottom-k | The first k streams incoming into a region |
| | Top-k | The last k streams incoming into a region |
| end time | MIN | The time when the first stream goes out from a region |
| | MAX | The time when the last stream goes out from a region |
| | AVG | The average outgoing time of streams from a region |
| | Bottom-k | The first k streams going out from a region |
| | Top-k | The last k streams going out from a region |
| time interval | MIN | The shortest staying time of streams in a region |
| | MAX | The longest staying time of streams in a region |
| | AVG | The average staying time of streams in a region |
| | Bottom-k | The k streams having the shortest staying time in a region |
| | Top-k | The k streams having the longest staying time in a region |

$l_k=b_{i-1}$. Similarly, a query $Q_k$ belongs to the $-DQSet_i$ of an RS node $N_i$ if the upper bound of its range forms the lower bound of $R_i$, i.e., $Q_k \in -DQSet_i$ if $u_k=b_{i-1}$.

Figures 2, 3:
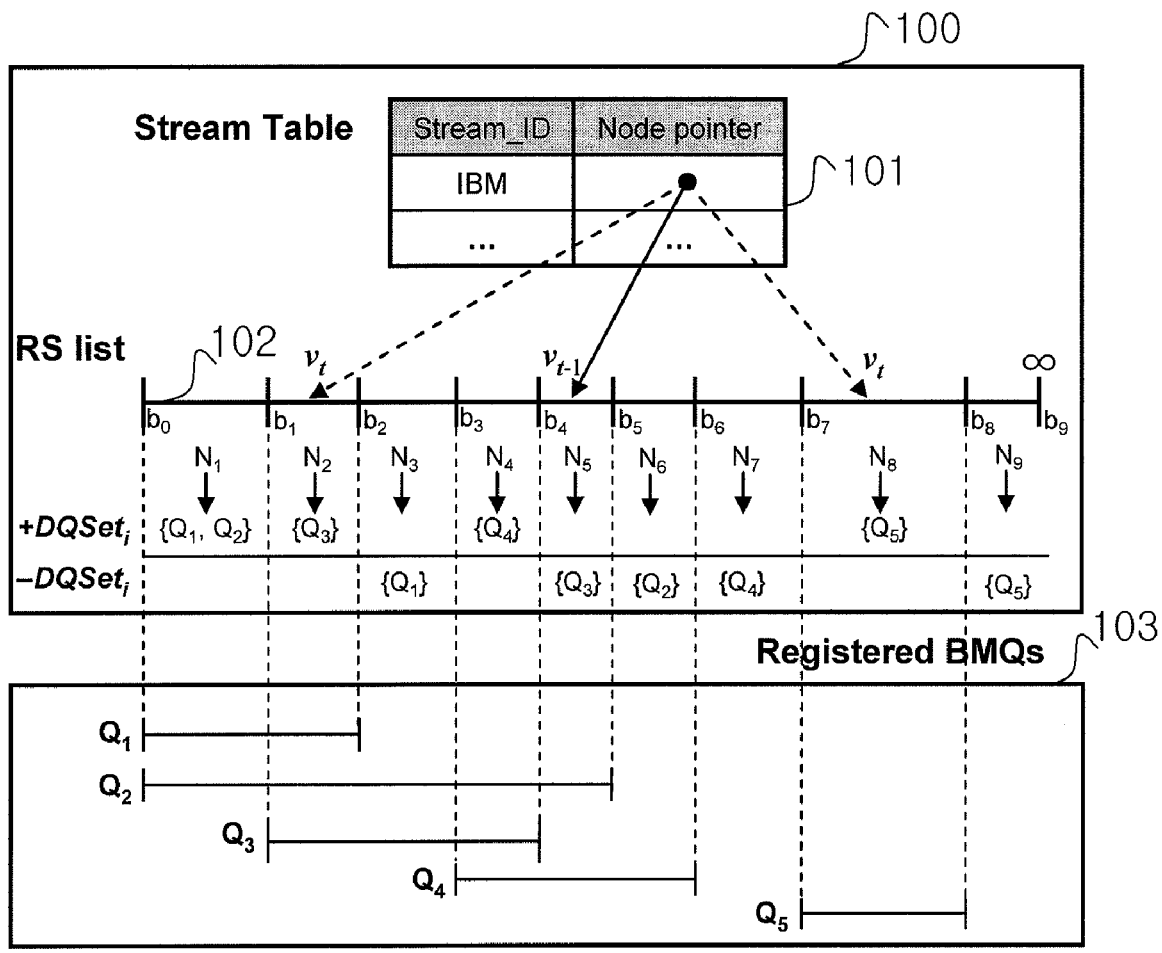
FIG. 2 is a one-dimensional BMQ-Index.
FIG. 3 is an incremental search algorithm for one-dimensional BMQ-Index.

In FIG. 2, an RS list is built for five BMQs. Nine RS nodes are created. Each node has a range and $\pm DQSet_i$. For instance, $N_5$ has a range $(b_4, b_5)$, $\{\ \}$ as a $+DQSet_5$, and $\{Q_3\}$ as a $-DQSet_5$.

<Query Registration and Deregistration>

A query can be dynamically registered and deregistered in BMQ-Index. Assume that a query $Q_{in}$ whose range is $(l_{in}, u_{in})$ is registered. First, BMQ-Index locates the RS node, $N_i$ which contains $l_{in}$, i.e., $b_{i-1} \leq l_{in} < b_i$. If $l_{in}$ is equal to $b_{i-1}$, $Q_{in}$ is inserted into the $+DQSet_i$ of $N_i$. Otherwise, $N_i$ is split into two RS nodes: the left node with the range of $(b_{i-1}, l_{in})$ and the right node with the range of $(l_{in}, b_i)$. The left node has the $\pm DQSet$ of $N_i$, and the right node contains $Q_{in}$ in its +DQSet Second, BMQ-Index locates the RS node, $N_j$ which contains $u_{in}$, i.e., $b_{j-1} \leq u_{in} < b_j$. If $u_{in}$ is the same as $b_{j-1}$, $Q_{in}$ is inserted into the $-DQSet_j$ of $N_j$. Otherwise, $N_j$ is also split into the two RS nodes: the left node with the range of $(b_{j-1}, u_{in})$ and the right node with the range of $(u_{in}, b_j)$. The left node has the $\pm DQSet$ of $N_j$, and the right node keeps $Q_{in}$ in its $-DQSet$.

When a query $Q_{out}$ whose range is $(l_{out}, u_{out})$ is deregistered, BMQ-Index first locates the RS node, $N_i$ whose lower bound is equal to $l_{out}$, and removes $Q_{out}$ from the $+DQSet_i$. If both $+DQSet_i$ and $-DQSet_i$ are empty, $N_i$ is merged with $N_{i-1}$. Second, BMQ-Index locates the RS node, $N_j$ whose lower bound is $u_{out}$, and removes $Q_{out}$ from $-DQSet_j$. If both $+DQSet_j$ and $-DQSet_j$ are empty, $N_j$ is merged with $N_{j-1}$.

<Shared Processing>

In border monitoring scenarios, a large number of BMQs can be issued by users. In order to achieve a high level of scalability, shared processing of BMQs is essential. For this purpose, BMQ-Index adopts a query indexing approach. Once BMQ-Index is built on registered BMQs, only relevant queries are quickly searched for without unnecessary access to irrelevant queries.

Upon an incoming data tuple (we assume that a tuple in a data stream has three attributes: stream_ID (the ID of stream source), value (the value measured at the stream source), and time_stamp (the time when the value was measured)), BMQ-Index retrieves two sets of relevant queries: (1) $QSet^+(t)$, the set of queries that match the current data value $v_t$, but do not match the previous data value $v_{t-1}$. (2) $QSet^-(t)$, the set of queries that do not match the current data value, but match the previous data value. ($v_{t-1}$ and $v_t$ are the values of two consecutive tuples of a data stream) We call them differential query sets.

<Incremental Processing>

Evaluating BMQs over continuous data streams involves successive retrievals of differential query sets. These successive operations result in considerably high processing cost when a huge volume of data streams are rapidly incoming.

To accelerate such successive operations, BMQ-Index employs an incremental access method. First, BMQ-index stores only delta query information. It divides a domain space, the range of possible data values, into region segments by the borders of queries. Then, it stores a query ID into only two segments where the query range starts and ends. We call the query stored in each segment delta query. Second, BMQ-index incrementally retrieves differential queries through linear traversals from a previous matching segment to a current matching segment. Note that differential queries are easily derived from the delta queries of the visited segments.

Based on the incremental access method, successive BMQ evaluations are greatly accelerated. Due to the locality of data streams, an updated data tuple probably remains in the same segment, which involves only a simple comparison operation. Even if it does not, it is highly possible that an updated data tuple falls in a nearby segment. Thus, differential queries are quickly searched for with a small number of segment visits.

<Incremental Search Algorithm>

In BMQ-Index, differential query sets are efficiently retrieved from delta query sets. Given two consecutive data values, $v_{t-1}$ and $v_t$, let $v_{t-1}$ fall in the range of an RS node $N_j$ and $v_t$ fall in that of $N_h$, i.e., $b_{j-1} \leq v_{t-1} < b_j$ and $b_{h-1} \leq v_t < b_h$. While visiting from $N_j$ to $N_h$, two differential query sets, $QSet^+$ and $QSet^-$ are evaluated as FIG. 3.

In FIG. 3, the evaluation of $QSet^+$ and $QSet^-$ depends on the relative order between $N_j$ and $N_h$. If $j<h$, $QSet^+$ has all queries in the union of $+DQSet_i$ excluding the queries in the union of $-DQSet_i$ where i takes the values from j+1 to h. Similarly, $QSet^-$ is calculated by subtracting the union of $+DQSet_i$ from the union of $-DQSet_i$. On the other hand, if $j>h$, $+DQSet_i$ and $-DQSet_i$ are switched while i takes the values from j to h+1. There is no differential query if j=h.

FIG. 2 shows the examples of our incremental search algorithm. Assume that the previous data value $v_{t-1}$ was located in $N_5$. If the current data value $v_t$ is located in $N_8$, $\pm DQSet$ are retrieved while visiting from $N_6$ to $N_8$. Thus, $QSet^+=\{Q_5\}$ and $QSet^-=\{Q_2, Q_4\}$. If $v_t$ is located $N_2$, $\pm DQSet$ are retrieved during node visits from $N_5$ to $N_3$. Thus, $QSet^+=\{Q_3, Q_1\}$ and $QSet^-=\{Q_4\}$.

As a third theoretical background, a structure and a processing algorithm for multi-dimensional BMQ-Index are described.

We design multi-dimensional BMQ-Index by directly extending one-dimensional BMQ-Index. N-dimensional BMQ-Index stores delta query information in N different RS lists. Each RS list contains borders and delta queries for one of N dimensions. Upon a data arrival, all RS lists are searched in order to obtain differential query sets per dimension. We develop an efficient cross-check algorithm, which validates queries in the per-dimension differential query sets to identify a final result.

Our invention has three advantages. First, it has significantly low storage cost. It is because a query is not repeatedly saved in an N-dimensional region but saved only a few times in N one-dimensional RS lists. Note that a query is saved only twice in an RS list. Second, it has a high search performance. As shown in Section 4.4, the search algorithm including the cross-check requires only $(N-1)\sqrt{N}$ times of search time for one-dimensional BMQ-Index. For the two-dimensional index, only $\sqrt{2}$ times as much search time as the one-dimensional index is needed. Finally, multi-dimensional BMQ-Index can be easily implemented due to the simplicity of the index structure and its access algorithms.

<Index Structure>

Figure 4:
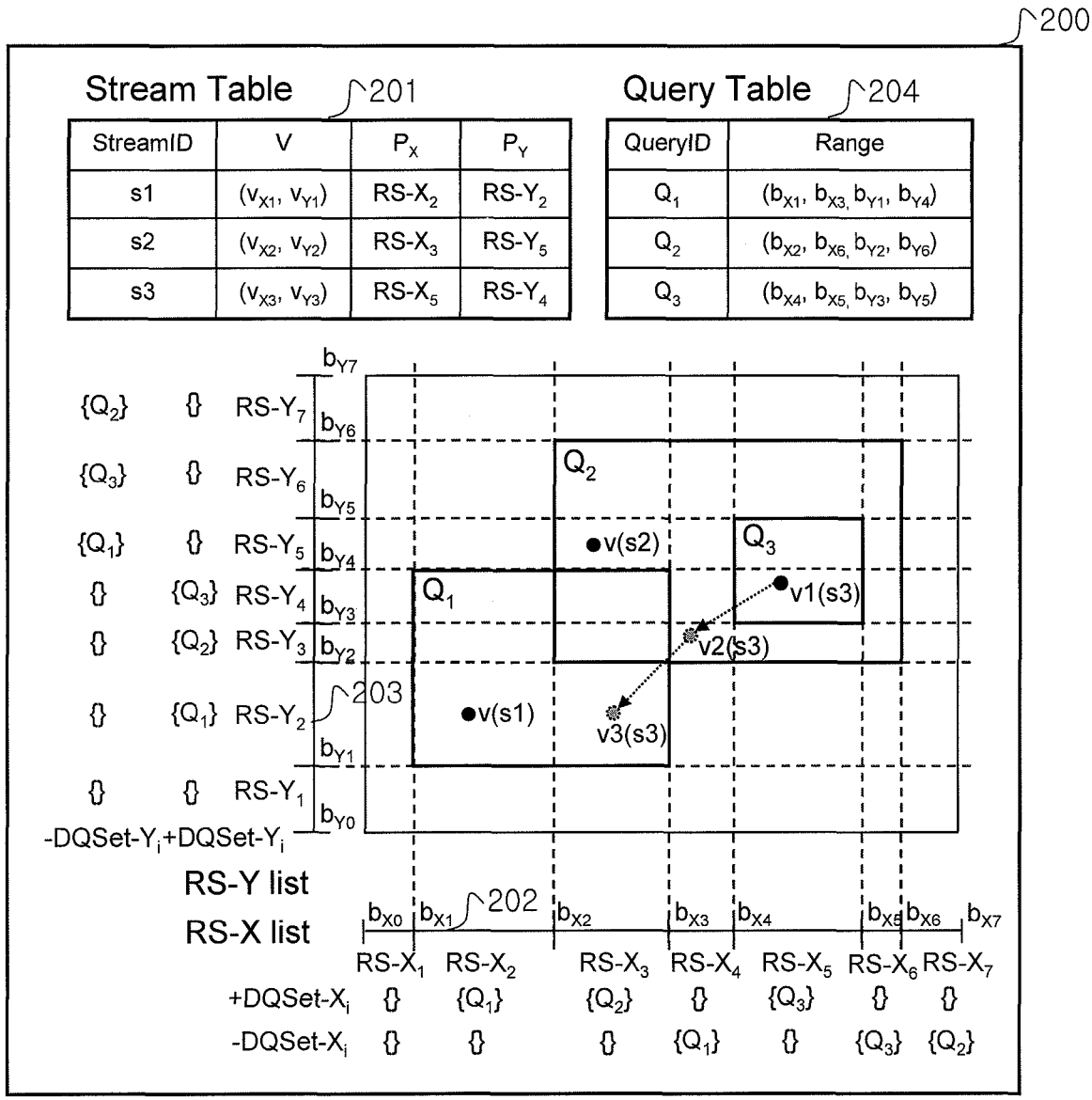
FIG. 4 is a two-dimensional BMQ-Index.

Two-dimensional BMQ-Index(200) consists of following data structures: two RS lists (an RS-X list:202 and RS-Y list:203), a stream table(201), and a query table(204). FIG. 4 shows an example of the index with three registered queries. The RS-X list is a list of region segments that together comprise the range of an X-dimension, $<RS-X_1, RS-X_2, \ldots, RS-X_n>$. Each region segment $RS-X_i$ maintains lower and upper bounds of the region and $\pm DQSet$ for the X-dimension. The RS-Y list maintains the information for a Y-dimension similar to the RS-X list.

In a two-dimensional case, each entry of the stream table has two pointers, $P_x$ and $P_y$, pointing $RS-X_i$ which contains the current X-dimension value of the stream, and $RS-Y_i$, which contains the current Y-dimension value of the stream. Also, current data value is saved for the next search operation. The stream table entry is updated upon an arrival of a new data tuple for each data stream. The query table, which is hashed with query ID, saves borders of queries; it is required for the cross-check algorithm.

<Query Registration and Deregistration>

Two-dimensional BMQ-Index also supports dynamic query registration and deregistration. Upon a query registration and deregistration, an X-dimension predicate and Y-dimension predicate of a query are separately processed. Consider a query $Q_n$, whose range is $(x_l, x_u, y_l, y_u)$. When registering $Q_n$ to the index, an X-dimension predicate, $(x_l, x_u)$, is registered in the RS-X list and an Y-dimension predicate, $(y_l, y_u)$, is registered in the RS-Y list. It is done by the one-dimensional query registration method. Also, $Q_n$ is added to the query table. Deregistration of $Q_n$ is similarly processed using one-dimensional deregistration method.

<Search Algorithm>

FIG. 5 shows overall flow of the search algorithm. Upon an arrival of a data value, two-dimensional BMQ-Index is searched to obtain QSet$^+$ and QSet$^-$. The first step of the algorithm is to calculate differential query sets for each dimension: ±XQSet and ±YQSet. This is simply done by applying one-dimensional incremental search algorithm on the RS-X list and RS-Y list.

The second step is to validate if all the borders of queries in ±XQSet and ±YQSet are indeed crossed by the data value. The validation is required because those queries may not satisfy the condition for other dimension. For the validation, we developed an efficient cross-check algorithm described in FIG. 6. The cross-check algorithm examines borders of unchecked dimensions of the queries in per-dimension differential query sets. For example, if a query $Q_i$ belongs to +XQSet, the cross-check algorithm checks if the data value actually crosses the Y-dimension border of $Q_i$. A cross-check method for +XQSet(+YQSet) is different from that for −XQSet(−YQSet). For a query in +XQSet, it is checked if a newly arrived data value is located between the Y-dimension borders of the query. On the other hand, for a query in −XQSet, it is checked if the previous value of the stream was located between the Y-dimension borders.

Through the cross-check, the verified result BMQ sets, ±XBMQSet and ±YBMQSet, are obtained. Finally, QSet$^+$ is calculated as a union of +XBMQSet and +YBMQSet. QSet$^-$ is also calculated similarly.

Embodiments of the present invention will be explained based on theoretical background described above.

Figure 7:
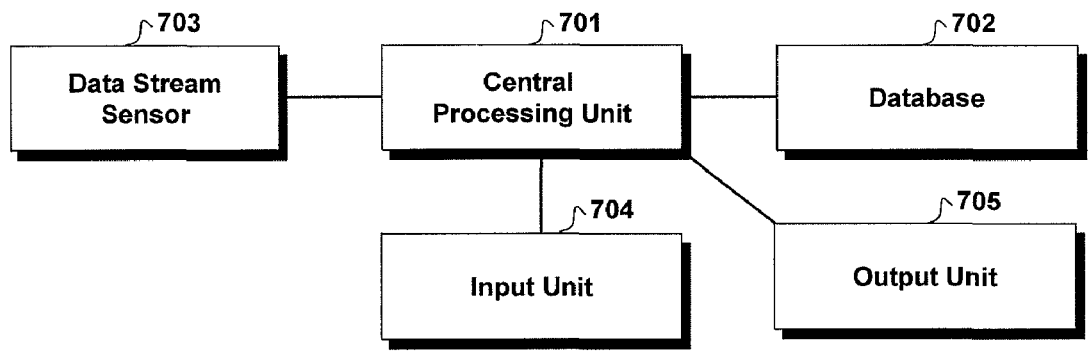
FIG. 7 is a block diagram illustrating a system.

FIG. 7 is a block diagram illustrating a system according to an example embodiment of the present invention.

A system according to an example embodiment of the present invention comprises central processing unit 701, database 702, data stream sensor 703, input unit 704, output unit 705.

The central processing unit 701 performs a method of an example embodiment of the present invention according to a programmed procedure. In addition, the central processing unit 701 turns location information of data stream source identified by location coordinates stored in the database into coordinates, these coordinates are prescribed as a data value in the present invention. The central processing unit temporarily stores the coordinates of identified data stream, if a data value has more than two dimensions, it applies the data value to the cross checking of a per-dimensional differential query set, it uses the data value to update BMQ-Index.

The database 702 turns locations of points in a region which the system of an example embodiment of the present invention handles into coordinates and stores the coordinates, and stores BMQ-Index according to the example embodiment of the present invention. In the example embodiment of the present invention, borders of region segment, borders of query region, region segment, query region, etc are determined based on the location coordinates stored in the database.

The sensor 703 performs a function of identifying a data stream and reporting it to the central processing unit. The data stream has a unique ID used to distinguish data streams so that the system can process multiple data, and the data stream has location information of data stream source.

The input unit 704 inputs new query information to the central processing unit or inputs information about existing queries registered in BMQ-Index.

The output unit 705 outputs results of data processed by the central processing unit. This may be a printer, a monitor, etc.

Figure 8:
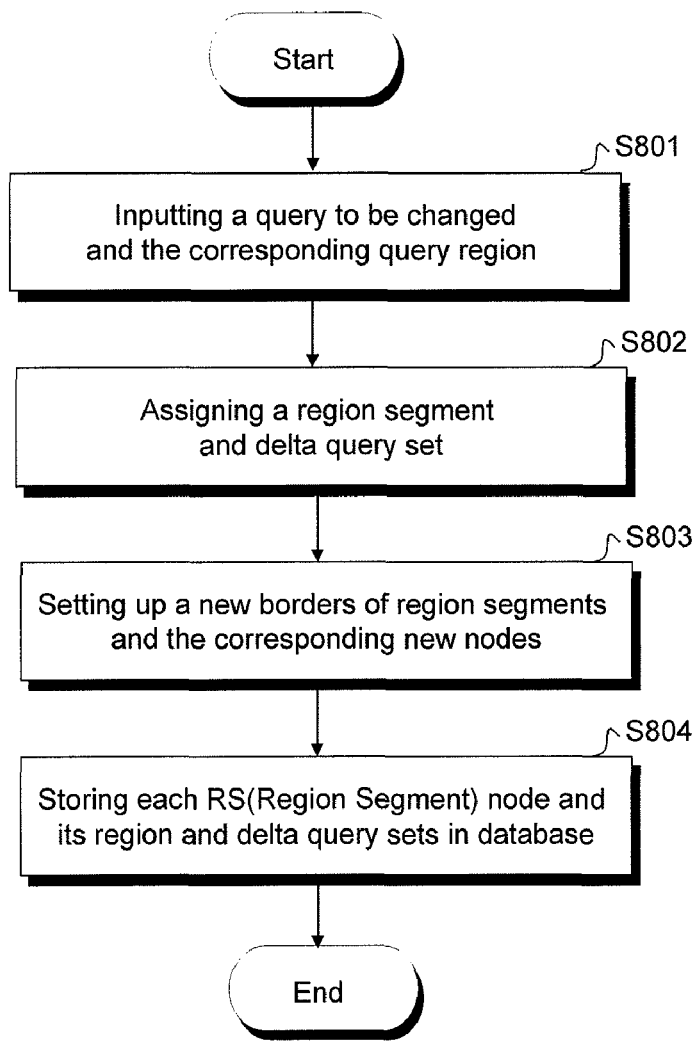
FIG. 8 is a flow chart to perform BMQ-Index update by query changes.

FIG. 8 is a flow chart to perform BMQ-Index update by query changes according to an example embodiment of the present invention.

As shown in FIG. 8, a method of performing BMQ-Index update by query changes according to an example embodiment of the present invention comprises, inputting a query to be changed and the corresponding query region from the input unit 704 to the central processing unit 701 (S801);

assigning a region segment and delta query sets based on borders of query to be changed in the central processing unit (S802);

setting up new borders of region segments ($b_0, b_1 \ldots, b_m$) and the corresponding new nodes ($N_1, N_2, \ldots, N_m$) (S803) in the central processing unit (S803); and storing each RS node and its region and delta query sets into the database in the central processing unit (S804).

If a query to be changed has a query region with more than two dimensions, the method includes registering/deregistering the query to be changed and the query region into/from the Query Table in the BMQ-Index. This is not described in the figure.

Figure 9:
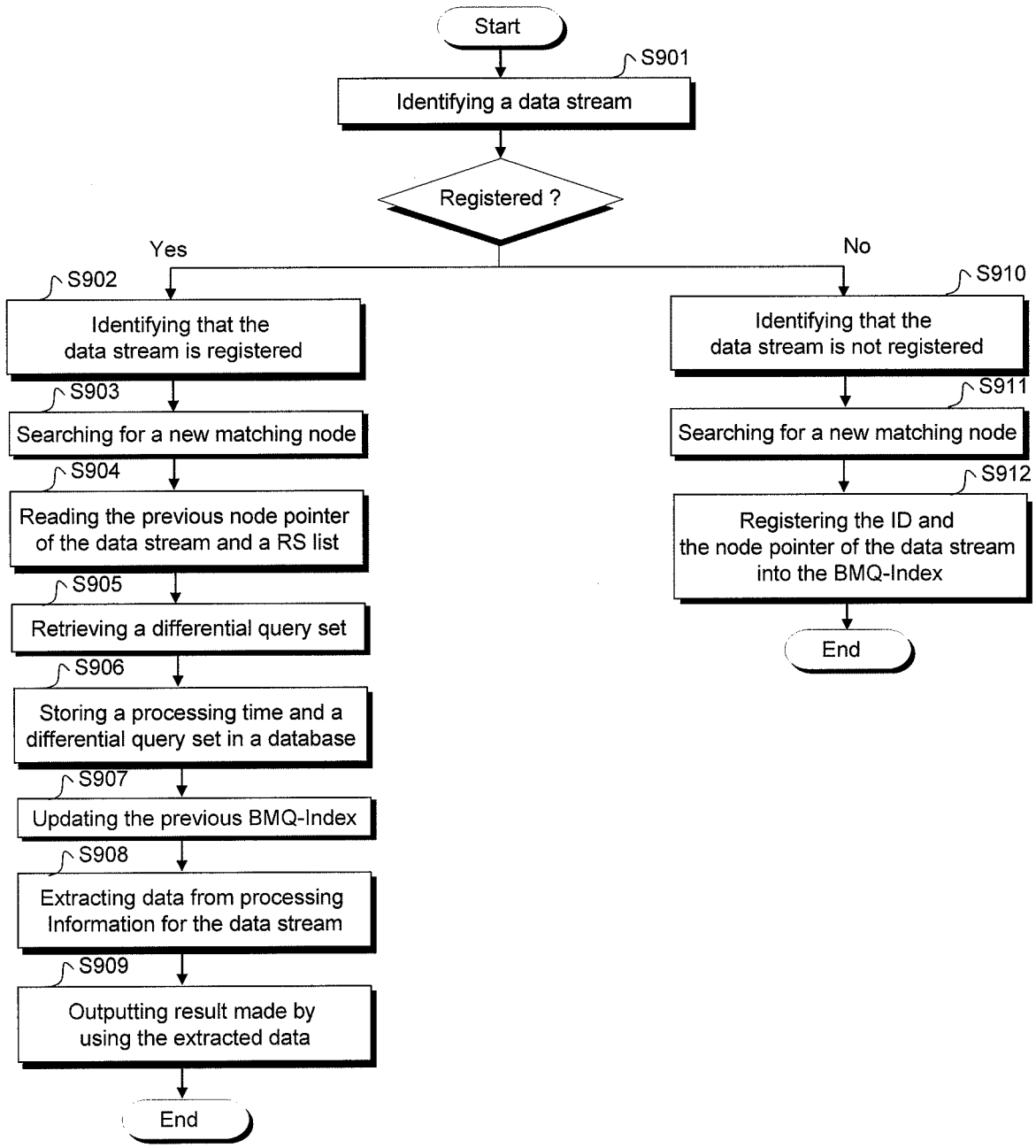
FIG. 9 is a flow chart to show a method of processing data streams using Border Monitoring Query.

FIG. 9 is a flow chart to show a method of processing data streams using Border Monitoring Query according to an example embodiment of the present invention.

As shown in FIG. 9, a method of processing data streams using Border Monitoring Query according to an example embodiment of the present invention comprises, identifying a data stream in the sensor 703 (S901);

checking an ID of the data stream in the central processing unit 701, testing whether the data stream is registered in the BMQ-Index or not, and identifying that it is registered (S902);

searching for a RS (Region Segment) node which contains a new data value of the identified data stream from the BMQ-Index and assigning a new node pointer for the data stream in the central processing unit 701 (S903);

reading the previous node pointer of the data stream and a RS (Region Segment) list from the BMQ-Index in the central processing unit 701 (S904);

traversing from the previous node to the new node in the RS list, and retrieving differential query sets (S905);

storing the data stream, the current processing time, and the differential query sets into a database in the central processing unit 701 (S906);

updating the previous BMQ-Index for the data stream with the new node pointer and new data value, if the data value has more than two dimensions, in the central processing unit 701 (S907);

extracting data from processing information for the data stream stored in the database 702 in the central processing unit 701, which comprises, in order to get count data for a specific query $Q_i$, selecting a specific processing time window, extracting data streams which include the query $Q_i$ among the differential query sets, i.e., the number of data streams which include the query $Q_i$ in $QSet^+$ and the number of data streams which include the query $Q_i$ in $QSet^-$, in order to get temporal aggregation data for a specific query $Q_i$, selecting a query $Q_i$ among the stored differential query sets, extracting data streams which include the query $Q_i$ among the differential query sets, extracting the processing time which include the query $Q_i$ in $QSet^+$ and the processing time which include the query $Q_i$ in $QSet^-$ for each data stream (S908), outputting the result made by using the extracted data in the central processing unit 701 through the output unit (S909);

checking an ID of the data stream in the central processing unit 701, testing whether the data stream is registered in the BMQ-Index or not, and identifying that it is not registered (S910);

searching for a RS (Region Segment) node from the BMQ-Index which contains a new data value of the identified data stream and assigning a node pointer for the data stream in the central processing unit 701 (S911); and registering the ID and the node pointer of the data stream into the BMQ-Index in the central processing unit 701, if the data value has more than two dimensions, registering them with the data value.

Since those having ordinary knowledge and skill in the art of the present invention will recognize additional modifications and applications within the scope thereof, the present invention is not limited to the embodiments and drawings described above.

INDUSTRIAL APPLICABILITY

The present invention relates to high performance and scalable data stream processing system used to monitor data streams (financial ticker, GPS data or a ubiquitous sensor network (USN)). Example application areas are location-aware service, context-aware service, environmental and financial monitoring applications.

Advances in mobile computing and embedded device technologies open up new computing environments. The environments contain large-scale data generators such as sensors, probes and agents, which generate data in the form of continuous data stream. In order to monitor such data streams and take proper actions promptly, if needed, users register a large number of range queries or filters which are evaluated continuously, and services are automatically provided to users in situation-aware fashion, thereby it is essential to develop high performance and scalable processing system used to monitor data streams in real-time.

Thus, the invention presents BMQ-Index, a scalable and high performance data stream monitoring framework. The main idea of BMQ-Index is shared and incremental processing. For shared processing, BMQ-Index adopts a query indexing approach, thereby achieving a high level of scalability. Once BMQ-Index is built on registered queries, only relevant queries are quickly searched for upon an incoming data. For incremental processing, BMQ-Index employs an incremental access method, i.e., an index structure to store delta query information and an incremental search algorithm. Thus, successive BMQ evaluations are greatly accelerated.

The invention claimed is:

1. A method of processing data streams using a Border Monitoring Query (BMQ), comprising:
   identifying a data stream, by a data stream sensor;
   checking an ID of the data stream, by a central processing unit, and checking a BMQ-Index, by the central processing unit, to determine that the data stream is registered in the BMQ-Index;
   assigning a new node pointer based on a new data value of the data stream, by the central processing unit;
   processing new information of the data stream using the BMQ-Index, by the central processing unit, and;
   updating the BMQ-Index with the new node pointer and new data value, by the central processing unit.

2. The method of claim 1, wherein the BMQ-Index consists of a stream table, multiple region segment lists, and a query table.

3. The method of claim 1, wherein the new node pointer is assigned by searching for a region segment node which contains the new data value of the identified data stream from the BMQ-Index.

4. The method of claim 1, wherein processing new information of the data stream comprises:
   reading a previous node pointer of the data stream and a region segment list from the BMQ-Index;
   traversing from a previous node to a new node in the region segment list, and retrieving differential query sets, and;
   storing the data stream, a current processing time, and the differential query sets in a database.

5. The method of claim 4, wherein retrieving the differential query sets comprises retrieving differential query sets incrementally through a linear traversal from a region segment matching a previous data stream to a region segment matching a current data stream.

6. The method of claim 1, wherein the BMQ-Index is a one-dimensional index consisting of a stream table and a region segment list.

7. The method of claim 6, wherein the stream table stores an ID of each registered data stream and a node pointer which points to a region segment node where a recent data value of each data stream is located.

8. The method of claim 6, wherein the region segment list comprises region segment nodes which have different ranges of region segments and two corresponding delta query sets.

9. The method of claim 1, wherein the BMQ-Index is a two-dimensional BMQ-Index consisting of a stream table, two region segment lists and a query table.

10. The method of claim 9, wherein the stream table stores, for each registered data stream, an ID of the data stream, two node pointers to a last located regions segment node and two last data values in X- and Y-dimensions.

11. The method of claim 9, wherein the region segment lists consist of a region segment list for an X-dimension and a region segment list for a Y-dimension, the region segment list for the X-dimension consists of region segment nodes and two delta query sets, and in the region segment list for the Y-dimension consists of region segment nodes and two delta query sets.

12. The method of claim 9, wherein the query table consists of borders of queries and query IDs which are hashed.

13. The method of claim 1, further comprising extracting data from data stream information stored in a database and outputting the extracted data.

14. The method of claim 13, wherein extracting the data comprises, in order to get count data for a specific query $Q_i$, selecting a specific processing time window, and
extracting data streams which include the query $Q_i$ among the differential query sets.

15. The method of claim 13, wherein the extracted data is outputted as one of inflow, outflow, net-flow and total-flow for a specific $Q_i$ during a specific time window.

16. The method of claim 13, wherein extracting the data comprises,
in order to get temporal aggregation data for a specific query $Q_i$,
selecting a query $Q_i$ among stored differential query sets, extracting data streams which include the query $Q_i$ among the differential query sets, extracting the processing time which include the query $Q_i$ in QSet$^+$0 and the processing time which include the query $Q_i$ in QSet$^-$ for each data stream.

17. The method of claim 13, wherein the extracted data is outputted as one of minimum, maximum, average, top-k and bottom-k for a specific $Q_i$, involving the begin time, end time, and time interval of satisfying a range condition of $Q_i$ during a specific time window.

18. The method of claim 13, wherein the extracted data is limited by a time window.

19. The method of claim 1, further comprising modifying the BMQ-index with new data values.

20. A method of processing data streams using a Border Monitoring Query (BMQ), comprising:
identifying a data stream, by a data stream sensor;
checking an ID of the data stream, by a central processing unit, and checking a BMQ-Index, by the central processing unit, to determine that the data stream is not registered in the BMQ-Index;
assigning a new node pointer based on a new data value of the data stream, by the central processing unit; and
registering the new node pointer and the ID of the data stream in the BMQ-Index, by the central processing unit.

21. The method of claim 20, wherein the node pointer is configured by reading a region segment node containing the new data value of the identified data stream in the BMQ-index.

22. The method of claim 20, further comprising modifying the BMQ-index with new data values.

23. A method of modifying a Border Monitoring Query (BMQ)-index, comprising:
inputting a query to be changed and a corresponding query region from an input unit to a central processing unit;
assigning a region segment and delta query sets based on borders of the query to be changed, by the central processing unit;
setting up new borders of region segments $(b_0, b_1, \ldots, b_m)$ and corresponding new nodes $(N_1, N_2, \ldots, N_m)$, by the central processing unit; and
storing each node and its region and delta query sets in a database, by the central processing unit.

24. The method of claim 23 that modifies the BMQ-index for a newly registered query $Q_{in}$ whose range is $(l_{in}, u_{in})$, wherein the BMQ-index:
locates the RS node, $N_i$ which contains $l_{in}$, the node $N_i$ having a range $(b_{i-1}, b_i)$,
inserts $Q_{in}$ into the +DQSet$_i$ of $N_i$ if $l_{in}$ is equal to $b_{i-1}$, or splits $N_i$ into two RS nodes: the left node with the range of $(b_{i-1}, l_{in})$ containing the ±DQSet of $N_i$ and the right node with the range of $(l_{in}, b_i)$ containing $Q_{in}$ in its +DQSet,
locates the RS node, $N_j$ which contains $u_{in}$, i.e., $b_{j-1} \leq u_{in} < b_j$,
and inserts $Q_{in}$ is inserted into the −DQSet$_j$ of $N_j$, if $u_{in}$ is the same as $b_{j-1}$, or splits $N_j$ into the two RS nodes: the left node with the range of $(b_{j-1}, u_{in})$ containing the ±DQSet of $N_j$ and the right node with the range of $(u_{in}, b_j)$ keeping $Q_{in}$ in its −DQSet.

25. The method of claim 23 that modifies the BMQ-index for a deregistered query $Q_{out}$ whose range is $(l_{out}, u_{out})$, wherein the BMQ-index:
locates the RS node, $N_i$ whose lower bound is equal to $l_{out}$,
removes $Q_{out}$ from the +DQSet$_i$,
merges $N_1$ with $N_{i-1}$ if both +DQSet$_i$ and −DQSet$_i$ are empty,
locates the RS node, $N_j$ whose lower bound is $u_{out}$,
removes $Q_{out}$ from −DQSet$_j$,
and merges $N_j$ with $N_{j-1}$ if both +DQSet$_j$ and −DQSet$_j$ are empty.

26. The method of claim 23 that modifies the BMQ-index, wherein all the operations of the modification are performed in each dimension for multi-dimensional cases.

27. The method of claim 23 that modifies the BMQ-index, further comprising registering or deregistering the modified query and its region into the query table of the BMQ-index, for multi-dimensional cases.

* * * * *

UNITED STATES PATENT AND TRADEMARK OFFICE
CERTIFICATE OF CORRECTION

| | | |
|---|---|---|
| PATENT NO. | : 7,895,188 B2 | Page 1 of 1 |
| APPLICATION NO. | : 11/741923 | |
| DATED | : February 22, 2011 | |
| INVENTOR(S) | : J. Lee et al. | |

It is certified that error appears in the above-identified patent and that said Letters Patent is hereby corrected as shown below:

At column 12, line 58 (claim 11, line 5) of the printed patent, please delete the word "in" after the word "and".

At column 13, line 14 (claim 16, line 8) of the printed patent, please delete the "0" before the word "and".

Signed and Sealed this
Twenty-third Day of August, 2011

David J. Kappos
*Director of the United States Patent and Trademark Office*